United States Patent

[11] 3,593,796

[72] Inventors Morgan Ashley Stainback;
 Evan Hoskins Street, Jr.; Robert Noel Tuttle, all of Houston, Tex.
[21] Appl. No. 837,181
[22] Filed June 27, 1969
[45] Patented July 20, 1971
[73] Assignee Shell Oil Company
 New York, N.Y.

[54] METHOD OF CONTROLLING FINE SAND PARTICLES WITHIN A RELATIVELY CONSOLIDATED SAND FORMATION
8 Claims, 2 Drawing Figs.

[52] U.S. Cl.................................................. 166/288, 166/292
[51] Int. Cl................................................... E21b 33/138
[50] Field of Search........................................ 166/273, 270, 276, 288, 292, 293, 294; 61/36

[56] References Cited
UNITED STATES PATENTS

| | | | |
|---|---|---|---|
| 2,025,948 | 12/1935 | Jorgensen...................... | 166/292 X |
| 2,131,338 | 9/1938 | Vail............................... | 166/292 |
| 2,330,145 | 9/1943 | Reimers......................... | 166/292 |
| 2,807,324 | 9/1957 | King et al...................... | 166/292 |
| 3,175,611 | 3/1965 | Hower........................... | 166/292 |
| 3,411,582 | 11/1968 | Dale.............................. | 166/292 |
| 3,422,890 | 1/1969 | Darley........................... | 166/274 |

Primary Examiner—Stephen J. Novosad
Attorneys—Louis J. Bovasso and J. H. McCarthy ABSTRACT: A method of controlling movement or displacement of fine sand grain particles within a relatively consolidated sand formation by successive injections of (1) an aqueous solution containing a silicate adapted to wet the fine sand, (2) a silicate-precipitating agent adapted to effect solidification of the silicates and (3) an oil-wetting agent so as to hold the sand grain particles in situ during subsequent fluid flow through the formation.

PATENTED JUL 20 1971

3,593,796

INVENTORS:
MORGAN A. STAINBACK
EVAN H. STREET JR.
ROBERT N. TUTTLE

BY: *Louis J Bovasso*

THEIR ATTORNEY

METHOD OF CONTROLLING FINE SAND PARTICLES WITHIN A RELATIVELY CONSOLIDATED SAND FORMATION

BACKGROUND OF THE INVENTION

1. Field of the Invention

This invention relates to treating relatively consolidated sand formations; and, more particularly, to treatment of fine sand particles within a relatively consolidated reservoir sand formation for improved and efficient recovery of fluids therefrom.

2. Description of the Prior Art

It is well known that many difficulties are encountered in producing or recovering fluids from incompetent earth formations due to collapsing or sloughing of the walls of well boreholes extending into such formations. For example, such unconsolidated formations may be comprised of sands containing very fine particles. In such reservoirs, the sands usually comprise particles having median grain sizes from about 0.1 to 1.0 millimeter and the very fine particles having median grain sizes of less than about 0.5 millimeter, such as silt-sized or smaller particles. The very fine particles are subject to movement by fluid flowing at relatively low rates, such as those occurring beyond the diameter of a conventional sand consolidation, that are too low to provide significant movement of the larger grains.

Where a relatively large volume of fluid is forced to flow through such a silty or dirty sand, the very fine particles tend to be carried along until they become lodged in the smaller interstices between the sand grains. This plugs the openings and reduces the permeability of the sand. A permeability impairment due to the movement of such particles is a major problem in the operation of fluid injection wells in reservoirs typical of those encountered in California and Alaska and fluid production wells in reservoirs typical of those encountered along the Gulf of Mexico.

Numerous sand consolidation techniques have been developed for interbonding the grains of a reservoir sand formation by depositing an organic or inorganic cementing material between the grains of the reservoir sand formation. The sand-consolidating bonding agents are relatively strong, stable materials capable of withstanding the high rates of fluid flow and high stresses which occur in the relatively small volumes of sand that are immediately adjacent to the openings into the well borehole. Since the flows into or out of such openings are generally radial, the rate of the flows tends to diminish in proportion to the cube of the distance from the opening. Within about 1 foot from such an opening, the rate of flow usually becomes so low that the entrainment of sand-sized particles becomes insignificant; but, in respect to very fine particles, such as silt-sized particles, at the same distance and rates of flow, the amount of entrainment is apt to be significant in respect to permeability impairment due to fine-particle movement.

SUMMARY OF THE INVENTION

It is an object of this invention to provide a method of inhibiting permeability impairment due to the movement of very fine sand particles within a porous sand disposed in a relatively consolidated sand formation.

It is a further object of this invention to inhibit the permeability impairment of such formations in a manner that protects the treated sand formation so that the leaching effect of subsequent fluid flow therethrough is reduced.

These and other objects are preferably carried out by successive injections into such formations of: (1) an aqueous solution containing a silicate adapted to wet the fine sand grain particles, (2) an aqueous solution of a silicate-precipitating agent capable of reacting with the silicate in solution (1) so as to form a solidifying material and therein to bind the fine sand grain particles, and (3) a solution containing an oil-wetting agent, thereby immobilizing the fine particles when subjected to subsequent fluid flow.

DESCRIPTION OF THE PREFERRED EMBODIMENT

Figure 1:
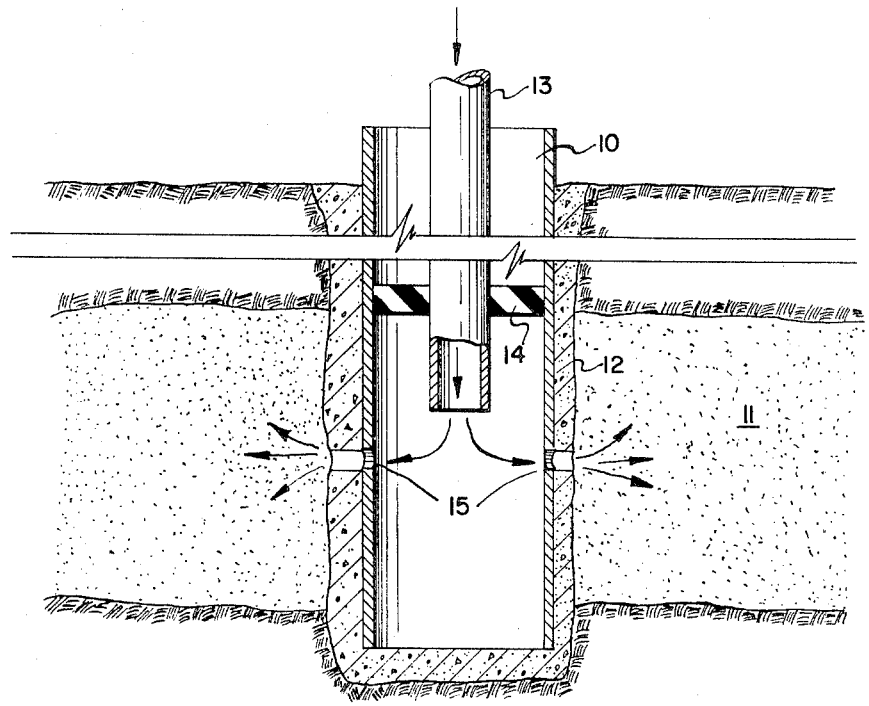
FIG. 1 is a vertical sectional view of a well borehole disposed in a relatively consolidated sand formation.

Referring now to the drawing, FIG. 1 shows a well borehole 10 extending into a relatively consolidated sand formation 11. It is to be understood that formation 11 may have been previously treated by known consolidating techniques as discussed hereinabove, thereby forming a relatively consolidated reservoir sand formation 11 containing very fine sand grain particles, particularly in regions beyond the effective diameter of a conventional sand consolidation. Such fine sand grain particles, if untreated, would "move" during subsequent fluid flow through formation 11 in the manner discussed hereinabove. Well borehole 10 is preferably cased at casing 12 with the casing 12 cemented therein as is well known in the art. A tubing string 13 is preferably disposed in well borehole 10 with tubing string 13 packed off at packer 14 as is also well known in the art. Finally, casing 12 is perforated at perforations 15 so that communication is established between tubing string 13 and the sand in formation 11. Although one such perforation is shown for convenience of illustration, obviously a plurality of such perforations may be formed in casing 12.

Figure 2:
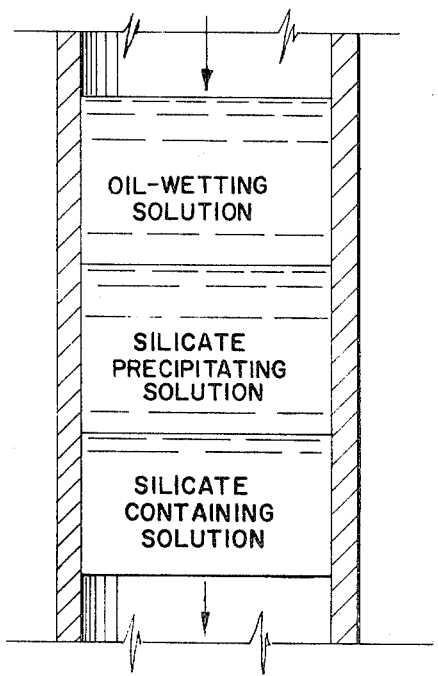
FIG. 2 is a vertical sectional view of a portion of the arrangement of FIG. 1 showing injection into the formation in accordance with the teachings of our invention.

The fine sand particles within formation 11 may be consolidated, in accordance with the teachings of our invention, by injection down tubing string 13 from a source (not shown), through perforation 15 and into formation 11 as indicated by the arrows in FIG. 1. More particularly, referring now to FIG. 2, an aqueous solution containing a silicate, e.g., an alkali metal silicate emulsified with a hydrocarbon such as diesel oil and capable of wetting fine sand grain particles in the relatively consolidated sand formation 11 is injecting down tubing string 13 and into formation 11. This injection is followed by an injection of a silicate-precipitating agent capable of reacting with the silicate to form a solidifying material which binds the fine sand grain particles. This treatment is followed by injection of an aqueous solution containing an oil-wetting agent. Preferably, the solution containing the silicate is an emulsion such as an oil-in-water emulsion having a continuous oil phase and containing sodium silicate. The silicate-precipitating agent is preferably an aqueous solution, e.g., a solution containing calcium chloride, which reacts with the silicate compound, e.g., the sodium silicate, in the emulsion to form a cement, calcium silicate cement. The oil-wetting material is preferably an oil-coating emulsion, as described in U.S. Pat. No. 3,422,890, which is capable of reducing the leaching effect of the subsequent injection of large volumes of water on the calcium silicate cement.

When the fine sand grain particles within a relatively consolidated reservoir sand are contacted, in succession, with an aqueous solution of a silicate, a silicate-precipitating agent and an oil-wetting agent, the fine sand grain particles become immobilized to an extent that inhibits a permeability impairment due to their movement within sand formation 11. Such a treatment uses relatively low-cost reagents that may be economically employed to treat a relatively large region, such as one having a diameter in the order of 10 feet or more, around the well borehole 10 (i.e., radially outwardly about 5 feet surrounding well borehole 10). The treatment of formation 11 may be advantageously applied as an additional sand-control treatment to supplement the effects of a previous sand-consolidation treatment, as discussed hereinabove. Although precipitated silicates have been tested and found to be generally unsuitable as sand-consolidating materials because of their tendency to be dissolved by aqueous fluids, when such precipitated silicates are formed within relatively consolidated sand formation 11 and are coated with an oil-wetting material, their stability and immunity to dissolution is sufficient to immobilize the very fine sand grain particles and prevent the impairment of permeability due to the movement of such particles.

The injection of the solution containing a silicate down tubing string 13 and through sand formation 11 leaves a thin coating on the fine sand grain particles without impairing the permeability of sand formation 11.

The precipitation of the silicate in the solution may be accomplished by contacting the silicate-wetted fine sand particles with an aqueous silicate-precipitating agent containing an alkaline earth metal salt, such as an alkaline earth metal halide, e.g., calcium chloride. Suitable precipitating agents also include acidic iron salts, such as ferrous sulfate, or other soluble salts of other metals; that is, copper, nickel, lead, etc. may be used, although such salts are generally of relatively higher cost than calcium or iron salts.

The oil wetting of the precipitated silicate may be accomplished by contacting the silicate with an oil-coating emulsion, as for example the oil-coating emulsions disclosed in U.S. Pat. No. 3,422,890. Alternatively, the silicate may be contacted with a dispersion of a preferentially oil-soluble surface-active salt, as for example Redicote TXO, a surfactant manufactured by the Armour Company, which is a surface-active cation salt of a surface-active anion. Such a surface-active salt is preferably dispersed in the aqueous or oil phase of a liquid carrier.

When well borehole 10 is used as a production well, the treatment steps disclosed hereinabove are all that is required. For example, the incoming fluids, that is, the fluids flowing from treated sand formation 11 into well borehole 10, contain subsurface waters that are in equilibrium with the silicates and other components of the reservoir rocks, and there is little tendency for such waters to dissolve the oil-coated, precipitated silicates.

When well borehole 10 is used as an injection well, i.e., where fluids are injected from well borehole 10 through sand formation 11, particularly when such injected fluids comprise hot aqueous fluids, the injected fluids are preferably pretreated by dissolving sufficient silicate in the fluid being injected so as to inhibit the dissolution of silicates in the treated zone surrounding well borehole 10. The injected aqueous fluid is mixed with sufficient siliceous material to form a solution that is substantially saturated with dissolved silica at a temperature exceeding the earth formation temperature. In general, this requires that the liquid phase of the injected aqueous fluid contain more than about half of the amount of dissolved silica acid that is required to saturate the liquid at a temperature that exceeds the temperature in the earth formation 11.

The pH of the injected aqueous fluid can also be a factor. In aqueous solutions containing silicates at a pH greater than 7, silicate ions are present as well as monocilicic acid and the solubility of silica in such solutions is greater than that of solutions of lower pH. In general, preferred solutions should be at least about 70 percent saturated with silica at the pH and the temperature at which they are injected, and should be injected at a temperature exceeding that in the treated sand formation 11 so to essentially prevent dissolution of the silica in sand formation 11.

Suitable silicate-containing aqueous liquids are those which contain sufficient dissolved silica, such as monosilicic acid and/or silicates capable of forming monosilicic acid, so that the liquid phase of the injected aqueous fluid is saturated to the extent of being incapable of dissolving silicates present in treated sand formation 11 even after heat loss is taken into account.

Many materials other than silica (quartz) are capable of forming detectable amounts of dissolved silica such as alkali metal silicates, sodium orthosilicate ($Na_4SiO_4$), sodium metasilicate ($Na_2SiO_3$), sodium disilicate ($Na_2Si_2O_5$), (sodium polysilicate), and colloidal silica, etc., which are soluble sodium silicates. Also, corresponding soluble potassium silicates as well as other alkali metal silicates such as solid amorphous silica (silica gel) which can yield monosilicic acid in equilibrium with water may be used. Even glasses with silica-to-alkali ratios higher than 3.2 to 1 may be used as well as any solid or liquid material yielding a sufficient concentration of dissolved silica may serve as a formation protective agent.

We claim as our invention:

1. A method of controlling fine sand grain particles within a relatively consolidated sand formation, said method comprising the steps of:

injecting into said formation an aqueous solution of a silicate compound adapted to wet the fine sand grain particles within the formation;

injecting into said formation, following the injection of said silicate-containing solution, an aqueous solution of a silicate-precipitating agent to form a binding material capable of holding the sand grain particles; and thereafter injecting a solution containing an oil-wetting agent into said treated formation.

2. The method of claim 1 wherein the first solution is a water-in-oil emulsion containing an alkali metal silicate.

3. The method of claim 2 wherein the oil phase of the emulsion is diesel oil and is the continuous phase.

4. The method of claim 3 wherein the emulsion contains an alkali metal silicate and the precipitating agent is an alkaline earth metal halide.

5. The method of claim 1 wherein the step of injecting an oil-wetting agent into said formation includes the step of injecting an oil-coating emulsion comprising a surface-active cation salt of a surface-active anion dispersed in an oil-phase liquid.

6. The method of claim 1 including the step of extending a well borehole into contact with said sand formation; and subsequently treating said formation at least 5 feet radially outwardly from said well borehole.

7. The method of claim 6 including the step of producing formation fluids from said formation and out of said well borehole.

8. The method of claim 6 including the step of injecting hot aqueous fluid down said well borehole and into said formation; and pretreating said hot aqueous fluid by dissolving an amount of siliceous material in said fluid sufficient to form a solution that is substantially saturated with dissolved silica at a temperature exceeding the temperature of said formation.